United States Patent [19]

Bausch

[11] Patent Number: 4,881,724
[45] Date of Patent: Nov. 21, 1989

[54] FLEXIBLE MOUNTING FOR ENGINES, MACHINE ASSEMBLIES AND THE LIKE

[75] Inventor: Paul Bausch, Hattenheim, Fed. Rep. of Germany

[73] Assignee: General Motors Corporation, Detroit, Mich.

[21] Appl. No.: 211,632

[22] Filed: Jun. 27, 1988

[30] Foreign Application Priority Data

Aug. 7, 1987 [DE] Fed. Rep. of Germany ....... 3726314

[51] Int. Cl.⁴ .......................... F16F 15/04; F16F 9/04; B62D 21/00
[52] U.S. Cl. ................................. 267/64.23; 180/312; 267/140.1
[58] Field of Search ...................... 267/35, 140.1, 219, 267/64.11, 64.23, 64.27, 121, 64.26, 136, 140.1 A, 140.1 R, 64.19; 248/562, 636, 638, 550, 559, 566; 180/300, 312

[56] References Cited

U.S. PATENT DOCUMENTS

| | | | |
|---|---|---|---|
| 2,387,065 | 10/1945 | Harding | 267/134 |
| 4,576,366 | 3/1986 | Gallas et al. | 267/140.1 X |
| 4,741,520 | 5/1988 | Bellamy et al. | 267/140.1 |

FOREIGN PATENT DOCUMENTS

| | | | |
|---|---|---|---|
| 2514295 | 10/1976 | Fed. Rep. of Germany . | |
| 3417927 | 11/1985 | Fed. Rep. of Germany . | |
| 3502479 | 7/1986 | Fed. Rep. of Germany ... | 267/140.1 |
| 3024089 | 11/1986 | Fed. Rep. of Germany . | |
| 1012584 | 4/1952 | France . | |
| 0197833 | 9/1986 | Japan | 267/140.1 |
| 0278334 | 12/1987 | Japan | 267/140.1 |
| 2028463 | 3/1980 | United Kingdom . | |

Primary Examiner—Robert J. Oberleitner
Attorney, Agent, or Firm—R. L. Phillips

[57] ABSTRACT

An elastic mounting for engines, machine assemblies and the like, constructed as a housing formed by a rigid mounting lower portion and a vulcanized buffer portion wherein the bearing load can be introduced into the mounting lower portion and into the buffer portion and compressed gas with controllable pressure can be admitted into the inner space of the housing, which acts as an air cushion, as well as a damper portion mounted in the housing with at least one throttle bore communicating with the inner space of the housing.

3 Claims, 1 Drawing Sheet

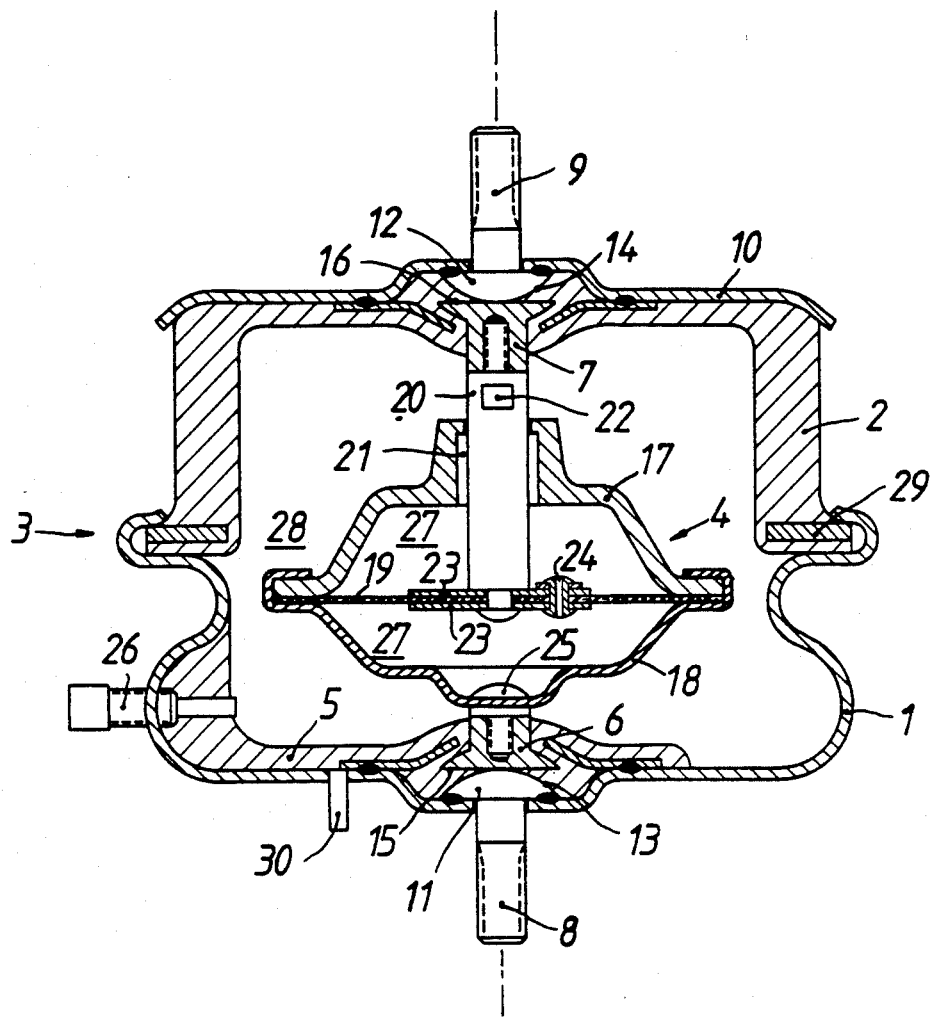

FLEXIBLE MOUNTING FOR ENGINES, MACHINE ASSEMBLIES AND THE LIKE

TECHNICAL FIELD

The present invention pertains to an elastic mounting for engines, machine assemblies and the like, comprising a housing formed by a rigid mounting lower portion and a buffer portion vulcanized to the upper portion, wherein the bearing load can be introduced into the mounting lower portion and the buffer portion, and the inner space of the housing, acting as an air cushion, is able to admit pressurized gas of controllable pressure, as well as a damper portion located in the housing with at least one throttle bore communicating with the inner space of the housing.

BACKGROUND OF THE INVENTION

An elastic mounting is known from DE-OS No. 34 17 927, in which a bottom plate provided with through bores subdivides the housing into two parts and a damper portion is formed by a domed section of the bottom plate, a section of the opposite plate, which is likewise provided with through bores and is domed in the opposite direction, and a flexible diaphragm with a damper bore, wherein the diaphragm is disposed between the lens-like formation formed by the sections of the bottom plate and the opposite plate. The diaphragm spans in a sealing manner the space between the bottom plate and the opposite plate, but it does not fully seal the gas spaces on both sides completely from each other because a throttled equalization of pressure differences is possible via the dampers which are constricted compared to the throttle bores. The pressure equalization is initiated by a deformation of the diaphragm, leading to flow through the damper bore only after the diaphragm abuts against one of the plates. In the case of an elastic mounting of this type, damping of the spring movement of the buffer portion is only possible beginning from a certain limiting amplitude because of the predetermined freedom of movement of the diaphragm, so that the mounting, which primarily acts as a buffer, is difficult to control with regard to the dynamic damping characteristic of the buffer, aside from the fact that it is necessary to use different mounting buffers which are independent components in terms of construction, rigidity and damping.

DE-OS No. 25 14 295 discloses an elastic mounting for engines in which an air cushion of controllable pressure is formed between a rigid mounting portion and a bellows and the spring excursions are limited by buffer portions disposed inside the bellows. One end of the bellows is fastened between a support cylinder serving as a rolling surface for it and a cap closing the supporting cylinder, and the other end is fastened to a hollow piston serving as a counter-rolling surface in a ring-shaped recess, and a stop lobe is guided by the cap in the piston whose inside is provided with buffer portions. The spring excursions caused by dynamic forces are damped by the flow of the medium located between the mounting portion and the bellows around the head of the lobe, and the flow through the head of the lobe is interrupted in the limiting case during spring travels in the static load direction of the engine. The dynamic damping is ensured by buffers in this prior art engine mounting as well, and the spring rate and the damping are mainly determined by these.

SUMMARY OF THE INVENTION

The present invention is directed to providing an elastic mounting of the above-mentioned type, in which the spring rate and the damping are mainly determined by the gas pressure, so that the buffer rigidity and the damping can then be maintained at low values in a mutually interdependent relationship.

This is accomplished by an elastic mounting of the above-described type, which is characterized in that the damper portion is formed by a rigid upper portion forming a housing and a lower portion, between which a diaphragm plate having at least one damper bore is held, and a damper plunger mounted in the buffer portion passes through a bore of the damper upper portion with play and is connected to the diaphragm plate, while the damper lower portion is connected to the rigid mounting lower portion.

The mounting according to the present invention has, within the housing formed by the upper portion and the lower portion, in which the entrapped gas acts as a gas spring, a damper portion into which pressure is directly admitted via the damper plunger as a function of the spring movements, and due to the play in the plunger bearing, the same gas pressure occurs in the vibration-free state in the damper chambers between the damper upper portion and the diaphragm plate and between the damper lower portion and the diaphragm plate as in the gas spring. During vibrations, the gas flowing through the damper bore as well as through the bearing gap steadily seeks to equalize the pressure, and the peak pressures occurring during resonance also occur with a phase shift in the damper chambers. The compressibility of the gas and the direct dependence on the buffer rigidity and the buffer damping lead to the frequency-selective characteristics of the mounting. A resonant vibration can be greatly damped without high damper forces being generated in the super critical range.

The design of the mounting according to the present invention makes it possible to realize a plurality of installation situations with one buffer construction and different gas pressures, so that the great variety of buffers and the cost of development of an engine suspension can be reduced. In addition, if the vehicle has a central air supply system, the gas pressure in the buffer and consequently the rigidity and the damping can be variably adjusted to the vibration characteristics.

According to a preferred embodiment of the present invention, the buffer portion is vulcanized to a rigid mounting upper portion, and the mounting upper portion and the mounting lower portion have fastening means for connection to the vehicle frame/chassis or the engine suspension holder. In addition, the mounting lower portion preferably has a vulcanized layer which is introduced into the connecting element holding the damper lower portion, wherein the end of the connecting member facing away from the damper lower portion and the end of the damper plunger facing away from diaphragm plate abut against the mounting lower portion and the mounting upper portion or with the fastening elements for connection to the vehicle frame/chassis or with the engine suspension holder and at least one of the parts abutting against each other has an outwardly directed convexly curved surface.

Air, which can advantageously be admitted into the housing through the mounting lower portion, is preferably used as the compressed gas. The diaphragm plate is preferably constructed as a rubber diaphragm with a fabric inlay to ensure reliable admission of pressure to the diaphragm plate through the damper plunger, should the diaphragm plate be held between two rigid plates in the zone of the points of contact of the damper plunger and the damper bore.

BRIEF DESCRIPTION OF THE DRAWING

An example of the present invention will be described below on the basis of the drawing of the single FIGURE which shows an axial section through an engine air suspension buffer. The buffer essentially consists of three rotationally symmetrical assembled components, i.e., a steel plate lower portion 1 and a vulcanized buffer upper portion 2 connected to the former, which form a housing 3 receiving compressed air, as well as a damper portion 4 disposed in the housing 3. The steel plate lower portion 1 has a vulcanized layer 5, and joints 6 and 7 for fastening the damper portion 4 are vulcanized into the vulcanized layer and into the buffer upper portion 2 concentrically to the axis of symmetry of the buffer. Concentrically to the axis of symmetry, screws 8 and 9 are also welded to the steel plate lower portion 1 and to a steel plate upper portion 10 connected to the buffer portion 2, and the buffer is fastened by these screws to the vehicle frame/chassis and to the engine suspension holder in a manner not shown in detail.

The screw heads 11 and 12 each are provided with convex sections 13 and 14 which abut against flat sections 15 and 16 of the vulcanized joints 6 and 7 and thus they guarantee accurate introduction of force into the joints 6 and 7 via the screws 8 and 9 even in greatly different vibrational states.

The damper portion 4 is designed as a diaphragm. It consists of an upper casting housing 17 forming an inner housing and a damper lower portion 18 made from drawing sheet metal, between which a diaphragm plate 19 designed as a rubber diaphragm with fabric insert is held. A damper plunger 20 is guided with play in the casting housing 17 in a sleeve 21 made from a synthetic material. At its end facing the joint 7, it has two flattened surfaces 22 (only one of which is shown) for tightening in the internal thread of the vulcanize joint 7, and its other end is connected to the diaphragm plate 19 which is held between rigid plates 23 in the region of the point of contact of the damper plunger 20. A damper bore 24 is provided in these plates and in the diaphragm plate 19 at spaced locations from the point of contact of the damper plunger 20. A screw 25 fixed to the damper lower portion 18 serves to secure the damper lower portion 18 to the vulcanized joint 6.

A valve 26 inserted into a bore in the steel plate lower portion 1 is used to fill the buffer with air. Due to the play in the plunger bearing, the same air pressure occurs in the vibration-free state in the damper chambers 27 formed in the damper portion 4 as in the gas spring 28 formed between the housing 3 and the damper portion 4. When vibrations occur, the air flow through the damper throttle bore 24 as well as through the bearing gap of the damper plunger 20 steadily seeks to equalize the pressure, and the peak pressures occurring during resonance also appear in the damper chambers 27 with a phase shift.

To mount the buffer according to the present invention, the damper portion 4 is screwed into the joint 6 and the damper plunger 20 is screwed into the joint 7 and both tightened, after which the buffer upper portion 2 in the steel plate lower portion 1 is beaded on the flange 29. The position of the buffer is fixed by a set pin 30 on the lower portion in the built-in state, e.g., the set pin fixes the lower portion relative to a vehicle frame/chassis (not shown) by engaging in a hole in the latter.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. Flexible mounting for machine assemblies comprising a pair of mounting members (1,10), an elastomeric body (2) connecting said mounting members and cooperating therewith to define a first chamber (28), damper means (4) mounted within said first chamber, said damper means comprising a housing (17,18) fixed to one of said mounting members (1), a diaphragm (19) separating the interior of said damper housing into a pair of damper chambers (27), a damper bore (24) connecting said damping chambers, a plunger (20) guided in said damper housing and fixed at one end to said diaphragm and at another end to the other of said mounting members (10), a gas passage between one of said damper chambers (27) and said first chamber (28), and all of said chambers charged with pressurized gas so that upon vibration of one mounting member relative to the other, gas flow is forced through said damper bore and said gas passage and steadily seeks to equalize the pressure in said chambers and wherein peak pressures in said damper chambers occur with a phase shift.

2. Flexible mounting for machine assemblies comprising a pair of mounting members (1,10), an elastomeric body (2) connecting said mounting members and cooperating therewith to define a first chamber (28), damper means (4) mounted within said first chamber, said damper means comprising a housing (17,18) fixed to one of said mounting members (1), a diaphragm (19) separating the interior of said damper housing into a pair of damper chambers (27), a damper bore (24) connecting said damping chambers a plunger (20) guided in said damper housing and fixed at one end to said diaphragm and at another end to the other of said mounting members (10), said plunger having a bearing gap providing a gas passage between one of said damper chambers (27) and said first chamber (28), and all of said chambers charged with pressurized gas so that upon vibration of one mounting member relative to the other, gas flow is forced through said damper bore and said gas passage and steadily seeks to equalize the pressure in said chambers and wherein peak pressures in said damper chambers occur with a phase shift.

3. Flexible mounting for machine assemblies comprising a pair of mounting members (1,10), an elastomeric body (2) connecting said mounting members and cooperating therewith to define a first chamber (28), damper means (4) mounted within said first chamber, said damper means comprising a housing (17,18) fixed to one of said mounting members (1), a diaphragm (19) separating the interior of said damper housing into a pair of damper chambers (27), a damper bore (24) through said diaphragm connecting said damping chambers, a plunger (20) guided in said damper housing and fixed at one end to said diaphragm and at another end to the other of said mounting members (10), said plunger having a bearing gap providing a gas passage between one of said damper chambers (27) and said first chamber (28), and all of said chambers charged with pressurized gas so that upon vibration of one mounting member relative to the other, gas flow is forced through said damper bore and said gas passage and steadily seeks to equalize the pressure in said chambers and wherein peak pressures in said damper chambers occur with a phase shift.

* * * * *